(12) United States Patent
Filippone

(10) Patent No.: US 11,465,659 B2
(45) Date of Patent: Oct. 11, 2022

(54) AUTONOMOUS SCOUTING RAIL VEHICLE

(71) Applicant: Claudio Filippone, College Park, MD (US)

(72) Inventor: Claudio Filippone, College Park, MD (US)

( * ) Notice: Subject to any disclaimer, the term of this patent is extended or adjusted under 35 U.S.C. 154(b) by 903 days.

(21) Appl. No.: 16/280,031

(22) Filed: Feb. 19, 2019

(65) Prior Publication Data
US 2019/0256113 A1     Aug. 22, 2019

Related U.S. Application Data

(60) Provisional application No. 62/632,387, filed on Feb. 19, 2018.

(51) Int. Cl.
| | | |
|---|---|---|
| *B61L 3/22* | (2006.01) | |
| *B61L 15/00* | (2006.01) | |
| *B61L 23/04* | (2006.01) | |
| *B61L 29/00* | (2006.01) | |
| *B61K 5/00* | (2006.01) | |

(52) U.S. Cl.
CPC .............. *B61L 23/042* (2013.01); *B61K 5/00* (2013.01); *B61L 3/227* (2013.01); *B61L 15/0027* (2013.01); *B61L 23/041* (2013.01); *B61L 15/0081* (2013.01); *B61L 29/00* (2013.01)

(58) Field of Classification Search
CPC ... B61K 5/00; B61K 5/02; B61K 5/04; B61K 5/06; B61L 3/227; B61L 15/002; B61L 15/0081; B61L 23/04; B61L 23/041; B61L 23/042; B61L 29/00

USPC .......................................................... 701/19, 20
See application file for complete search history.

(56) References Cited

U.S. PATENT DOCUMENTS

| | | | | |
|---|---|---|---|---|
| 13,080 | A * | 6/1855 | Coon ....................... | B61K 5/04 104/273 |
| 3,881,426 | A * | 5/1975 | Long ......................... | B61C 9/38 104/45 |
| 3,918,366 | A * | 11/1975 | Noah ....................... | B61K 5/02 114/77 R |
| 5,429,329 | A * | 7/1995 | Wallace ................... | B61L 23/34 246/126 |
| 5,786,750 | A * | 7/1998 | Cooper .................. | B61L 23/041 246/166 |
| 6,417,765 | B1 * | 7/2002 | Capanna ................ | B61L 23/045 246/166 |
| 7,469,479 | B2 * | 12/2008 | Jager ....................... | E01B 35/00 33/651 |

(Continued)

FOREIGN PATENT DOCUMENTS

| | | | | |
|---|---|---|---|---|
| CA | 3065618 | A1 * | 6/2020 | ............... B61K 9/08 |
| EP | 124180 | | * 11/1984 | ............... B60F 1/04 |
| EP | 0773153 | | * 5/1997 | ............. B61D 15/00 |

*Primary Examiner* — Joshua E Rodden

(57) ABSTRACT

Various embodiments of an autonomous rail vehicle that can travel ahead of a locomotive at a distance proportional to the locomotive's stopping capability are disclosed. The rail vehicle may scan its surroundings, gauges track conditions, and communicates with locomotive operators of the scanned results in real-time to timely enable activation of the locomotive's emergency brakes in case of detection of off-normal track conditions. The rail vehicle may paired with the locomotive and provides eyes to locomotive operators so that they can have information on tracks viability well ahead of the locomotive.

2 Claims, 10 Drawing Sheets

(56) References Cited

U.S. PATENT DOCUMENTS

| | | | |
|---|---|---|---|
| 9,079,109 B2* | 7/2015 | Buhler | B60W 30/16 |
| 9,950,716 B2* | 4/2018 | English | B61K 9/08 |
| 10,029,708 B2* | 7/2018 | Viviani | B61L 23/041 |
| 10,471,976 B2* | 11/2019 | Mian | G05D 1/0274 |
| 10,689,016 B2* | 6/2020 | Woo | B61L 27/04 |
| 2012/0274772 A1* | 11/2012 | Fosburgh | G01C 11/04 |
| | | | 348/149 |
| 2014/0138493 A1* | 5/2014 | Noffsinger | B61L 23/044 |
| | | | 246/121 |
| 2015/0053827 A1* | 2/2015 | Noffsinger | B61L 3/121 |
| | | | 246/121 |
| 2015/0375765 A1* | 12/2015 | Mustard | B61L 99/00 |
| | | | 701/19 |
| 2016/0107664 A1* | 4/2016 | Kull | B61L 23/044 |
| | | | 246/121 |
| 2016/0368510 A1* | 12/2016 | Simon | B61K 9/08 |
| 2017/0267264 A1* | 9/2017 | English | B61L 23/042 |
| 2019/0017244 A1* | 1/2019 | Malmberg | B61K 5/02 |
| 2019/0061793 A1* | 2/2019 | Holmes | B61L 15/0027 |

* cited by examiner

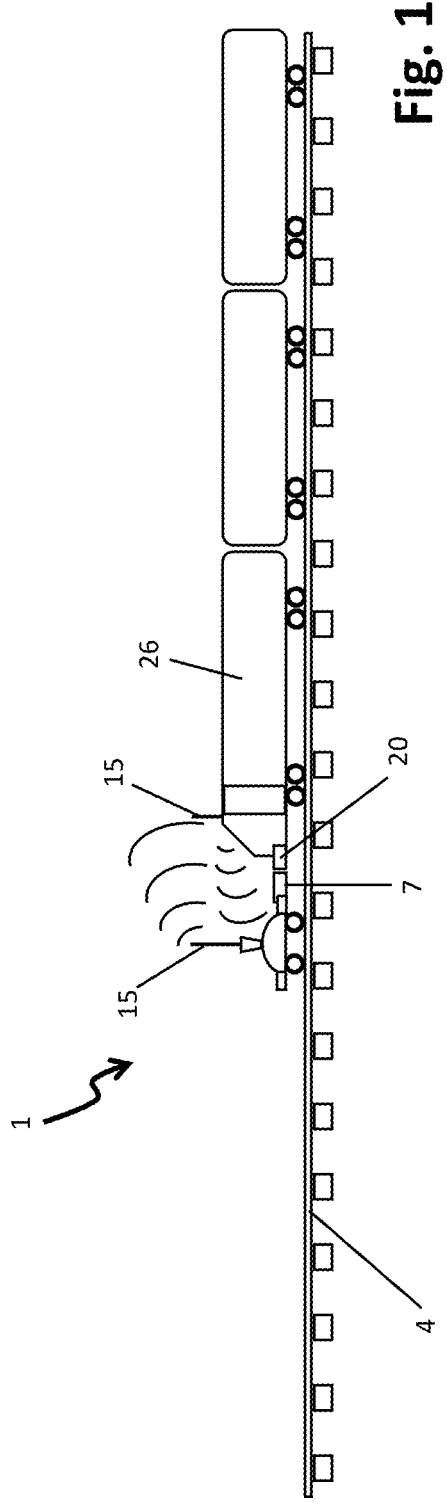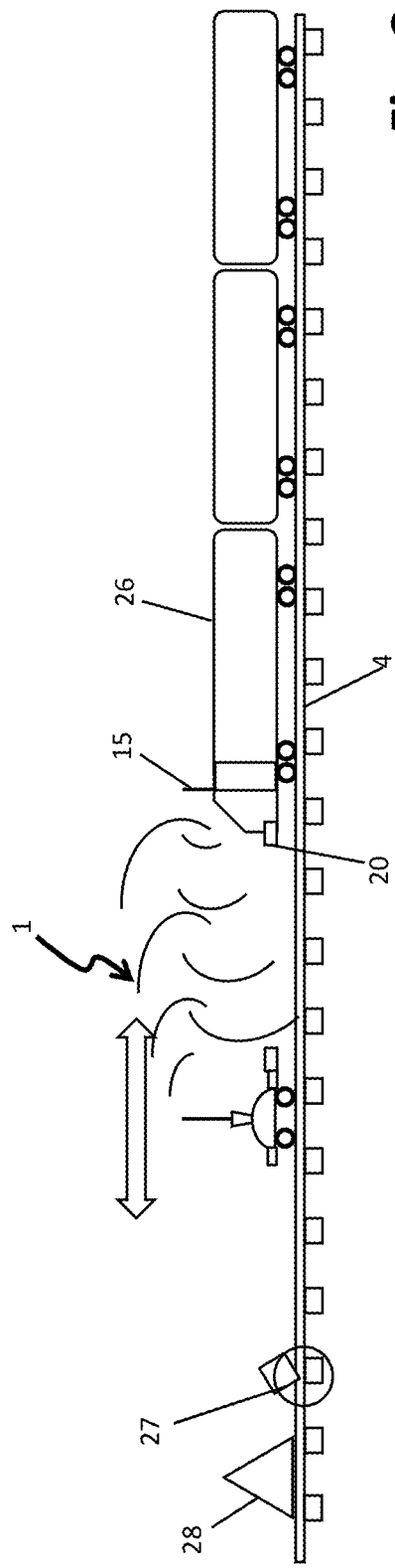

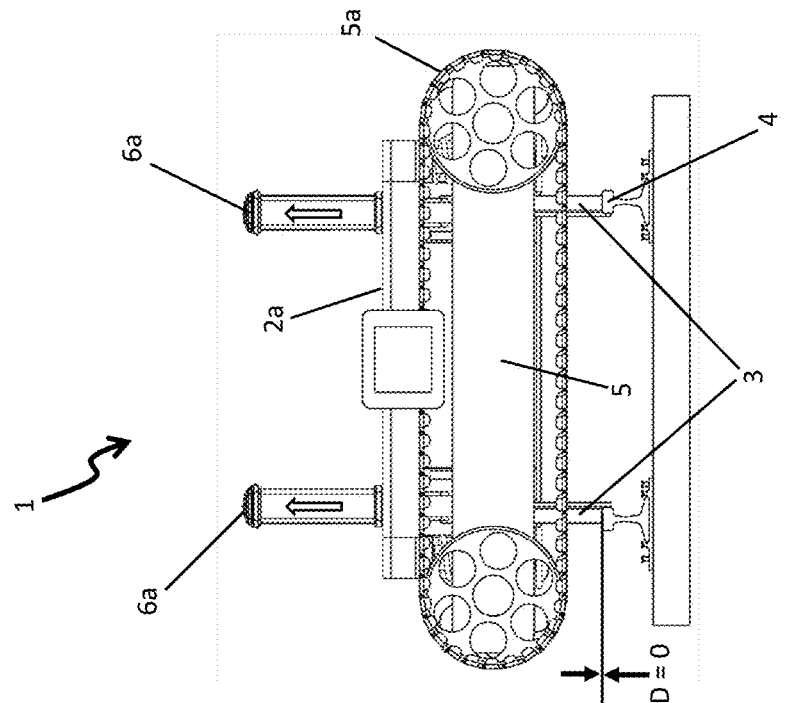
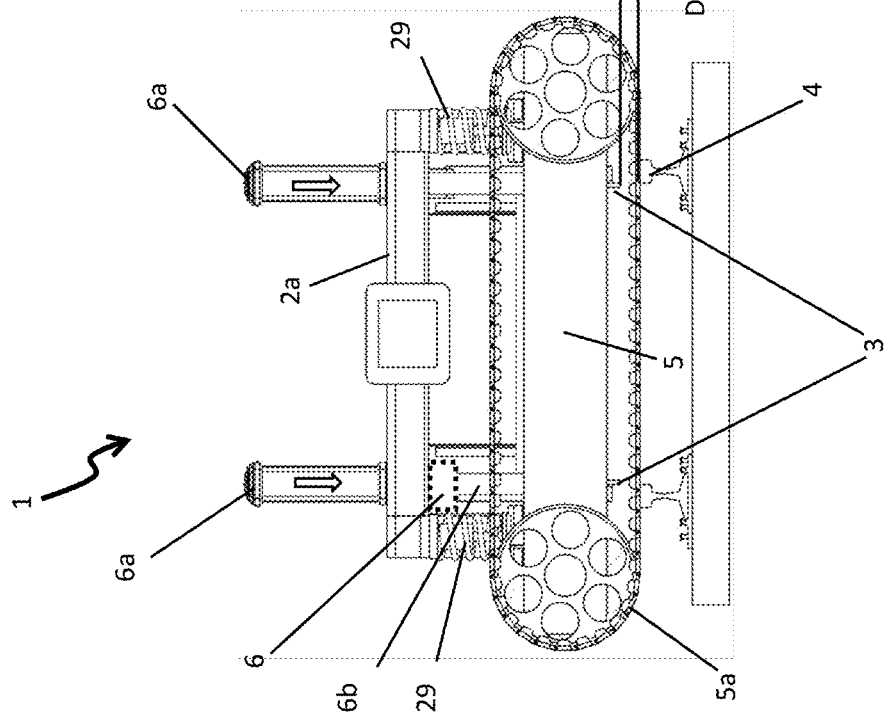

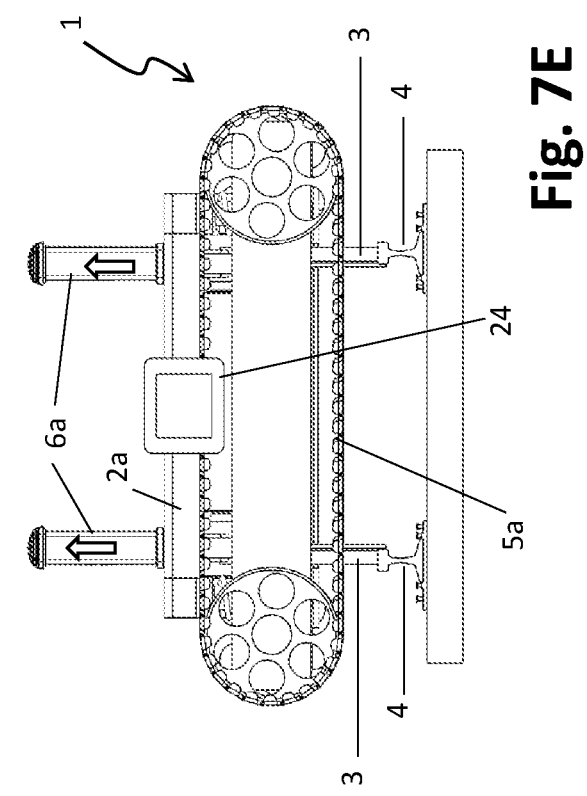
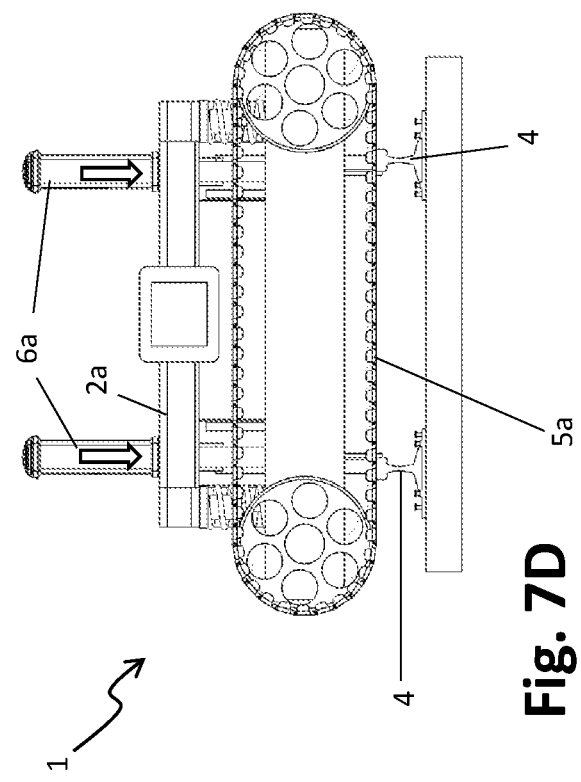
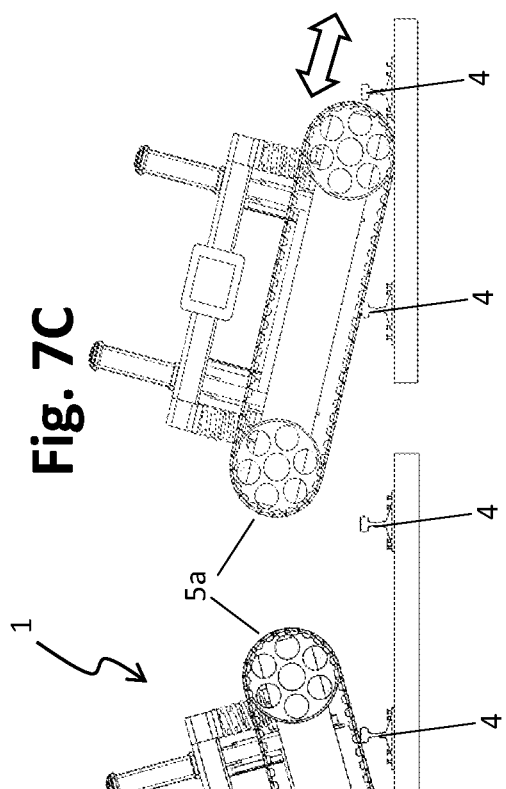
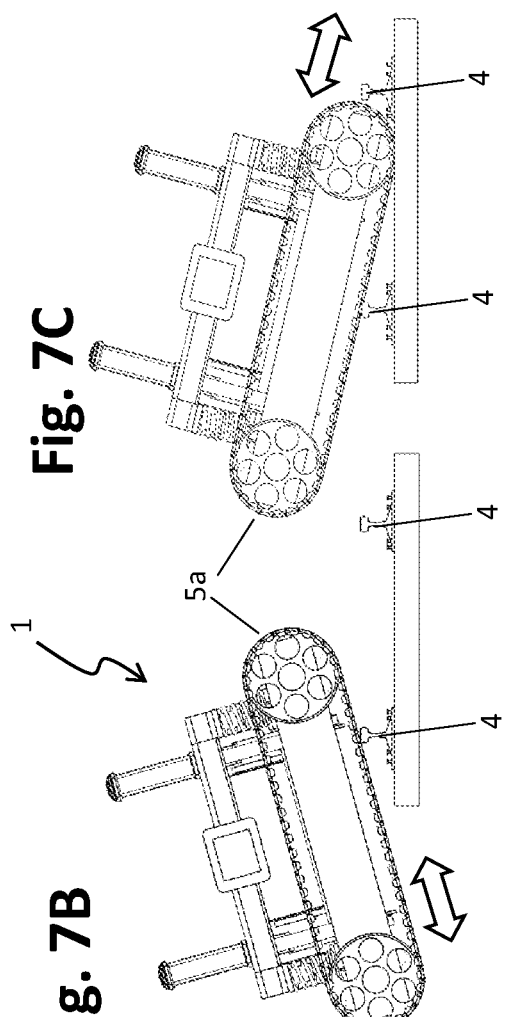
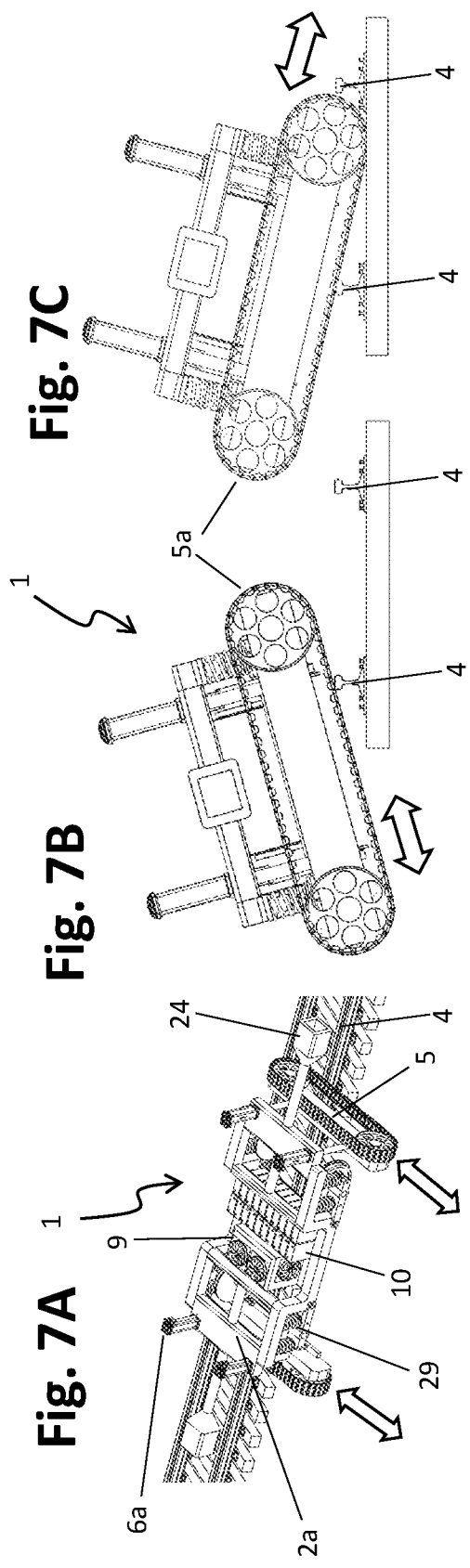

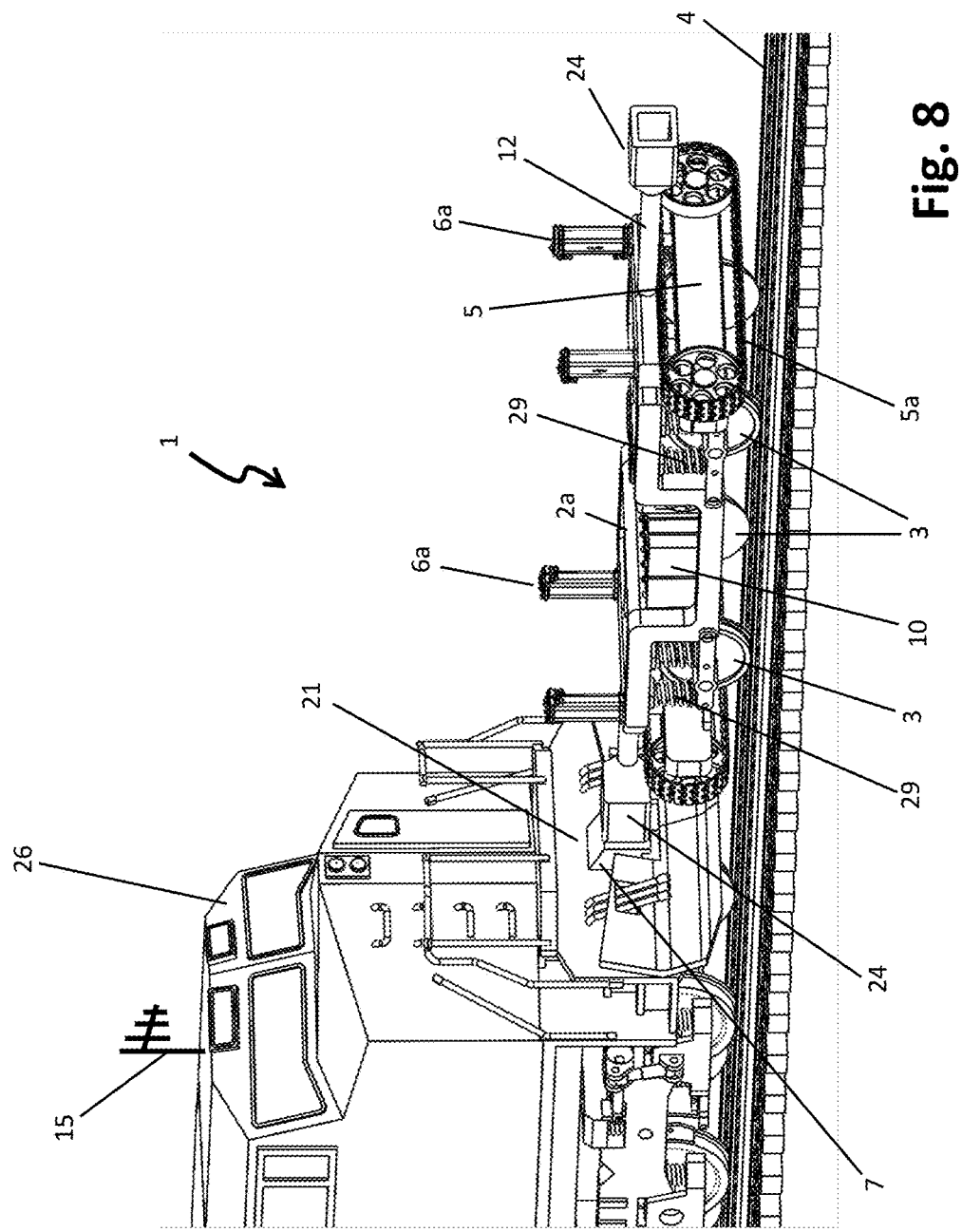

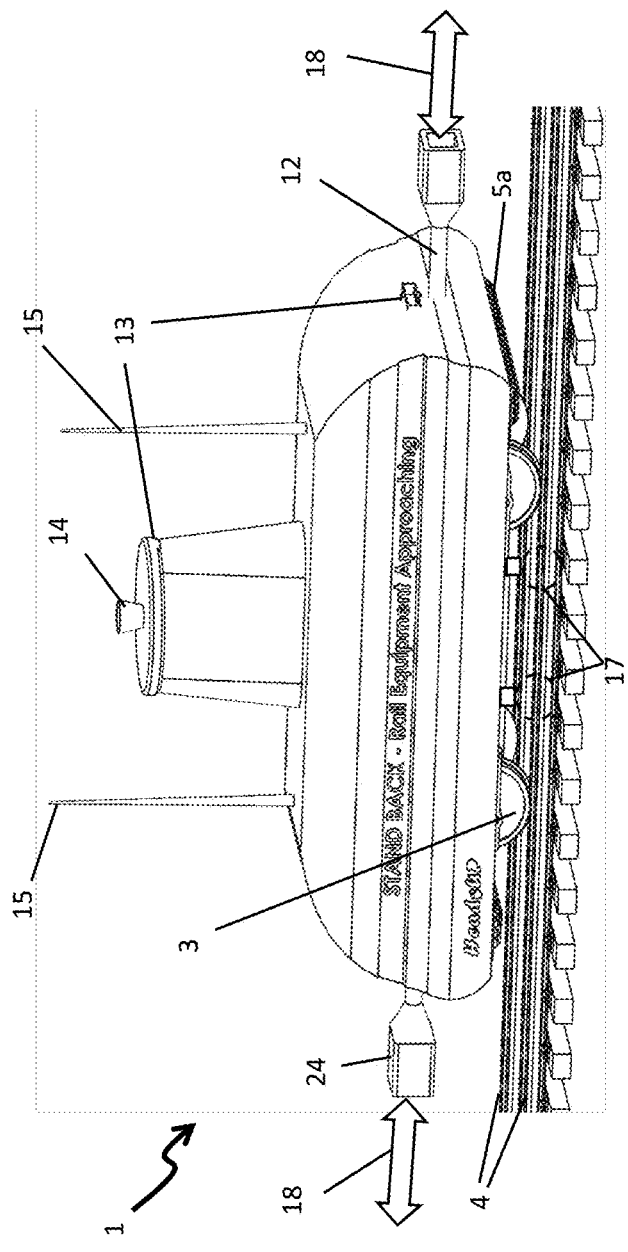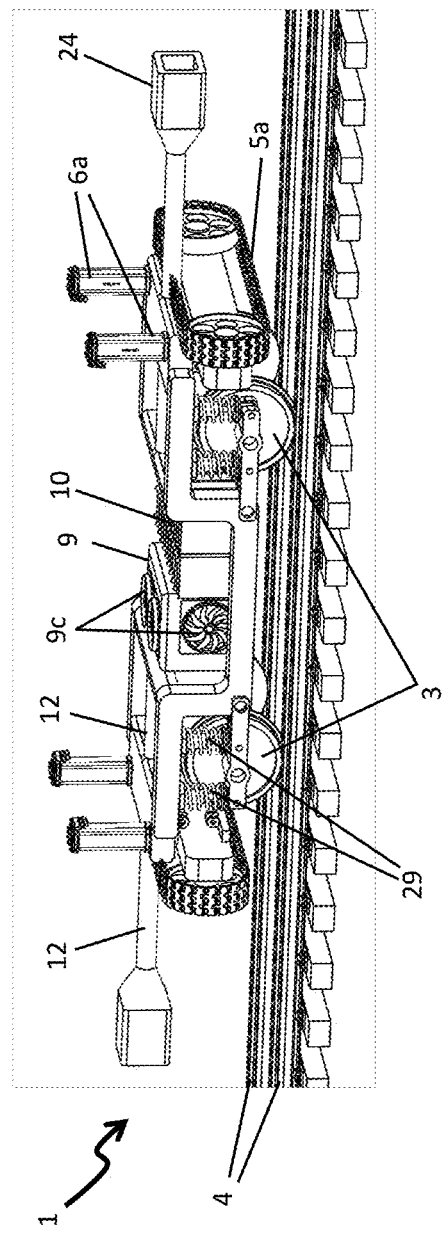

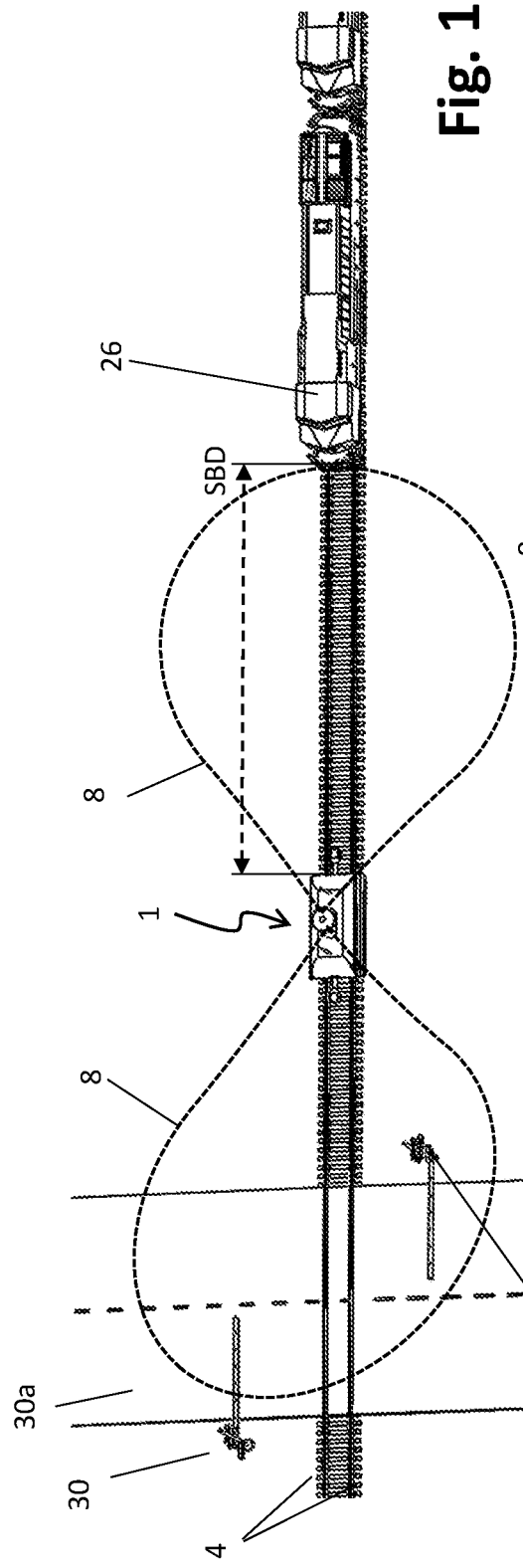
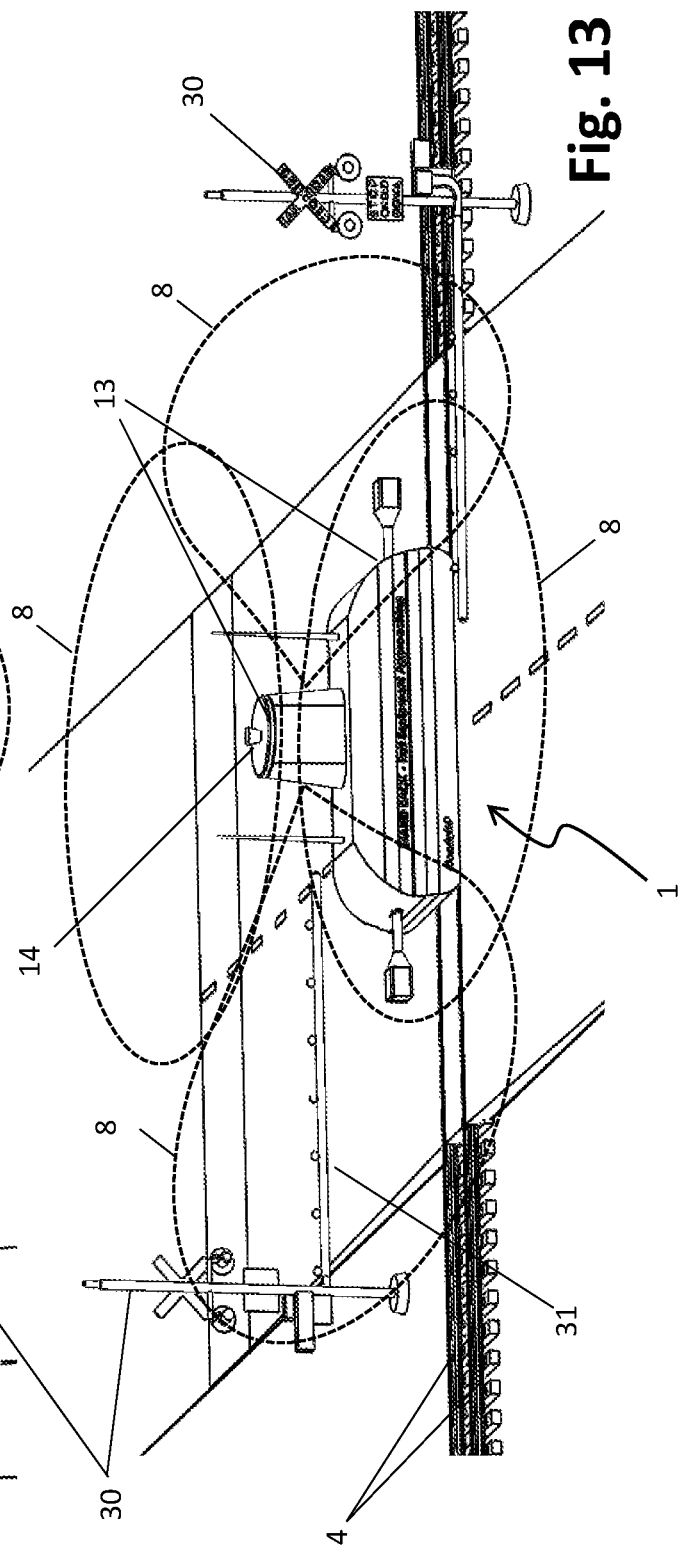

AUTONOMOUS SCOUTING RAIL VEHICLE

This application claims the benefit of priority under 35 U.S.C. § 119(e) of U.S. Provisional Application No. 62/632,387, filed Feb. 19, 2018, which is incorporated by reference herein in its entirety.

FIELD OF THE INVENTION

Embodiments of the present invention generally relate to locomotive safety systems and related methods. More specifically, particular embodiments of the present invention relate to an autonomous rail vehicle system configure to inspect unsafe conditions ahead of a locomotive and notify rail operators of the unsafe conditions.

DESCRIPTION OF RELATED ART

Locomotive accidents caused by rail track trespassers, track obstructions, and/or faulty or damaged rail equipment can be avoided if locomotive operators are timely notified of such unsafe conditions. To implement an effective collision avoidance procedure, emergency notifications must be communicated to locomotive operators in real-time and sufficiently in advance. For example, stopping a locomotive requires approximately 1 mile from the time rail or locomotive operator activates the emergency brakes. This means that a locomotive moving at 55 mph requires the activation of emergency brakes at least 65 seconds to fully stop the locomotive. A locomotive operator, however, usually cannot see such a far distance ahead of a moving locomotive. Thus, by the time a locomotive operator visually identifies a track obstruction or rail defect in front of the locomotive and activates the emergency brake procedure, there would not be enough time to stop the locomotive and to avoid an accident.

To mitigate accidents caused by rail defects, rail defect detection systems, including real-time detection systems, are currently being used to detect rail defects. These systems are assembled onto or directly coupled to rail carts and record and process data as they pass through rail tracks to identify rail defects. However, these systems are not designed to travel ahead of the operating locomotive to detect obstacles or other hazardous conditions.

SUMMARY

Accordingly, there is a need for an improved locomotive safety system that may overcome one or more of the problems discussed above. In particular, according to one exemplary aspect, there is a need for an improved safety system that can detect hazardous conditions in real time and at a certain distance ahead of a traveling locomotive, which would enable timely activation of emergency braking systems to save lives and mitigate property damages.

Rail vehicle 1 may exchanges wireless information with the locomotive's operators to notify off-normal rail track conditions, including tracks flaws and obstacles or obstructions in real-time. Rail tracks' obstacles can be represented by intentional or unintentional trespassers, and by rail and non-rail mechanical and/or equipment failures. More specifically, particular embodiments of the invention relate to an rail vehicle 1 that continuously scans its surroundings, gauges track conditions and potential flaws, and communicates with locomotive operators to timely notify and induce activation of emergency brakes in case of rail vehicle 1 detection of off-normal track conditions. In some exemplary embodiments, rail vehicle 1 leverages sensor technologies developed for driverless electric and hybrid cars (e.g. equipped with an internal combustion engine to recharge the car's battery pack). The rail vehicle 1 can be "paired" to the locomotive to also provide locomotive operators with information on tracks viability in excess of 1 mile ahead of the locomotive. For example, at rail crossings, rail vehicle 1 can be programmed to stop and, augmented with flashing lights and acoustic signals (e.g. as those characterizing fire tracks and emergency responders), inform potential trespassers of the approaching locomotive, while physically obstructing the rail-crossing to impede motorists-vehicular crossing. The rail vehicle 1 is also equipped with video capturing equipment to record individuals and motor vehicles trespassing the rail tracks for usage during prosecution (e.g. similarly to motorist speed video capturing devices utilized to enforce road speed limits).

The present invention relates to an autonomous rail vehicle that can be configured to travel ahead of the locomotive (railroad carriages and locomotives) at a distance proportional to the locomotive's speed, while wirelessly exchanging real-time data with rail operators in charge of the locomotive and other rail operators in data processing centers. Generally, rail vehicle 1 travels at a distance ahead of its paired locomotive and notifies rail operators of off-normal rail tracks conditions and obstacles or obstructions.

Additionally, rail vehicle 1 can be equipped with an autonomous power supply and propulsion system leveraging powered the coupling of an internal combustion engine with a battery recharging system, as normally equipping hybrid fossil-fueled and electric cars. The rail vehicle 1 can be magnetically "paired" to the locomotive (e.g. head locomotive), to wirelessly—or through transmission via tracks, provide visual and acoustic information via user interface to locomotive operators to ensure the locomotive has sufficient time to avoid collisions or derailment. For example, at rail crossings, rail vehicle 1 can be configured to stop and, augmented with flashing lights and acoustic signals, to inform potential trespassers of the approaching locomotive, while physically impeding motorists-vehicular crossing independently of the status of crossing gate barriers (or lack thereof). The locomotive characterizing an average freight train can be formed by 90-120 rail cars. When traveling at 55 miles-per-hour (mph), a typical freight train might require in excess of 1 mile to stop as a result of emergency brake activation. A typical locomotive characterizing a typical passenger train may be formed by 8 rail cars and locomotive(s) and travel at an average speed of 80 mph. From activation of the emergency brakes, as the traveling speed is higher, the passenger train will also require approximately 1 mile to stop.

It is an object of the present invention to provide an Autonomous rail-track-scouting Vehicle, hereinafter referred to as "rail vehicle 1" to enhance rail transport safety, save lives, and reduce property damage.

In some exemplary aspects, the disclosed rail vehicle 1 may satisfy one or more of the following requirements: i) It is self-powered and autonomous traveling ahead of the locomotive through locomotive-specific pre-programmed travel parameters; ii) it can be wirelessly paired to a user interface coupled with the locomotive; iii) It can be mechanically coupled to the locomotive (e.g. head rail car or locomotive) via magnetic coupling; iv) It can convert its battery pack electric power and supply electricity to the locomotive or locomotive, conversely, it can recharge its battery pack via electricity provided at the pair interface with the rail car of locomotive—electric power transfers between the paired rail car or locomotive occurs via electromagnetic coupling at rail vehicle 1 pair housing interface; v) It can generate electricity via its internal combustion engine (e.g. hybrid car configuration), and supply said electricity to the locomotive or to external electric loads (e.g. emergency responders equipment); vii) It can wirelessly communicate with other rail vehicle 1s paired to locomotives traveling in the opposite bound, and exchange information about derailments, obstructions, potential rail-track off-normal conditions manifested in the rail tracks of locomotives traveling in opposite bounds; viii) It can recharge its battery pack as it is "pushed" or "pulled" by the locomotive (e.g. via rail vehicle 1 traction motors/generators); ix) It can utilize rail tracks sections (up to a few miles from the pair locomotive) to transmit and receive data to/from the locomotive; It can be maneuvered while off rail tracks with its own autonomous tread-traction motors to be aligned with the rail tracks and coupled to them; x) While off-track and maneuvering beside the rail tracks it can climb rugged terrains and the rail tracks themselves, execute alignment of rail vehicle 1 wheels and coupling with the rail tracks; xi) It can be equipped with sensor, data processing and transmission equipment to scan rail tracks for flaws as rail vehicle 1 travels ahead of the locomotive; xii) It is equipped with redundant systems so that each rail vehicle 1 axle is independently powered with independent braking systems; xiii) Its pairing system is coupled to a hydraulic dampening, shock absorbing system to minimize mechanical stresses during pairing operations and in case of pairing or other rail vehicle 1 systems malfunctioning; xiv) It can be equipment with fire suppression equipment to support locomotive's operators (e.g. locomotive engine fire) and emergency responders; xv) It can record trespassers information (e.g. video).

To attain the advantages and in accordance with the purpose of the invention, as embodied and broadly described herein, one aspect of the invention provides an autonomous rail vehicle 1 to increase rail transport safety.

Another object of the present invention is to provide a method to independently transport and drive rail vehicle 1 to rail track locations for aligning and coupling of rail vehicle 1 wheels with the rail tracks.

Another object of the present invention is to provide rail vehicle 1 with features enabling seamlessly and non-invasively pairing with the locomotive (e.g. head rail car or locomotive), wherein a pairing mechanism is retrofitted with the structure supporting conventional rail couplers and the other is integral with rail vehicle 1.

Another object of the present invention is to enable automatic activation of the locomotive emergency brakes should rail track off-normal conditions be detected by rail vehicle 1, and the locomotive stopping time/distance found to be near the minimum stopping distance necessary—no time for the locomotive operators to execute manual emergency brake activation.

Additional objects and advantages of the invention will be set forth in part in the description that follows, and in part will be obvious from the description, or may be learned by practice of the invention. The objects and advantages of the invention will be realized and attained by the elements and combinations particularly pointed out in the appended claims.

It is to be understood that both the foregoing summary description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1 is a functional schematic of a scouting rail vehicle in an undispatched state with the rail vehicle physically coupled to a locomotive, according to an exemplary embodiment consistent with the present disclosure.

FIG. 2 is a functional schematic of the scouting rail vehicle in a dispatched state with the scouting rail vehicle traveling at a distance ahead of the locomotive to detect any unsafe condition in the path of the locomotive.

FIGS. 5 and 6 are side views of the rail vehicle seen from the direction of the track, illustrating a coupling mechanism for positioning the rail vehicle on and off the track.

FIGS. 7A through 7E are perspective and cross-sectional views of the rail vehicle shown in FIGS. 1-6, illustrating the track-climbing and positioning capability of the rail vehicle, according to one exemplary embodiment consistent with the present disclosure.

FIG. 8 is a perspective view of the rail vehicle shown without a hood and paired to a locomotive, according to an exemplary embodiment consistent with the present disclosure.

FIGS. 9 and 10 are perspective views of the rail vehicle with and without a hood, according to one exemplary embodiment consistent with the present disclosure.

FIG. 12 is a top view of the rail vehicle scanning ahead of the locomotive to verify safe rail tracks viability, where the rail vehicle travels at a safe breaking distance (SFB) ahead of the locomotive.

FIG. 13 is a perspective view of the rail vehicle stopped at a rail crossing and executing visual and acoustic signaling to potential trespassers while exchanging data with locomotive operators, according to an exemplary embodiment consistent with the present disclosure.

DESCRIPTION OF EXEMPLARY EMBODIMENT

Figure 3:
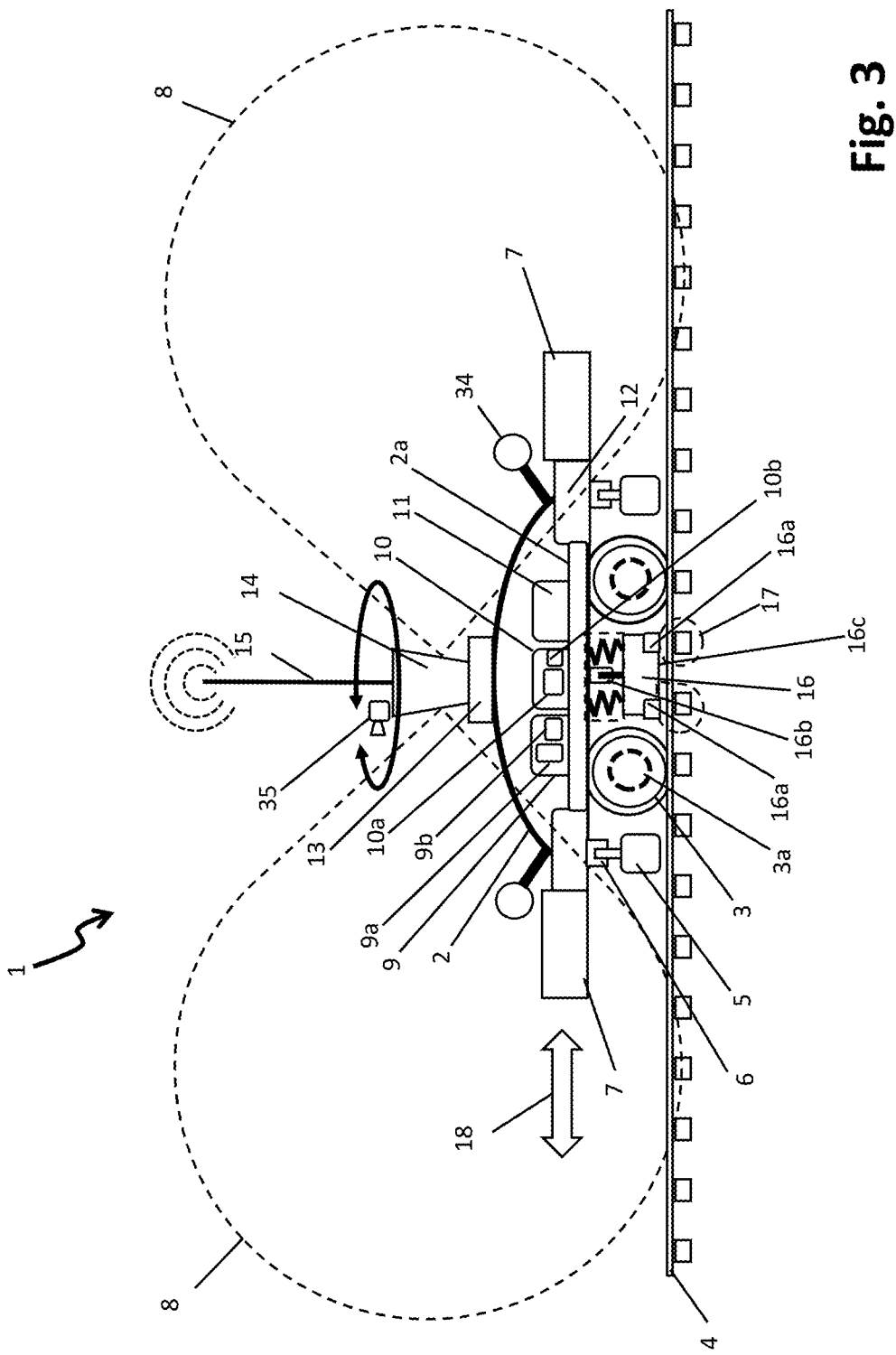
FIG. 3 is a functional schematic of the rail vehicle of FIGS. 1 and 2, illustrating various components and features thereof, according to some exemplary embodiments of the present disclosure.

Reference will now be made in detail to the exemplary embodiments of the invention, examples of which are illustrated in the accompanying drawings. Wherever possible, the same reference numbers will be used throughout the drawings to refer to the same or like parts.

According to various exemplary aspects of the present disclosure, FIGS. 1 and 2 show functional schematics of an autonomous scouting rail vehicle 1 that can travel in a rail track 4 ahead of a locomotive 26 to detect any defect 27 or obstruction 28 in rail track 4 or any other unsafe condition in the path of locomotive 26. In an exemplary embodiment, rail vehicle 1 may travel at a distance proportional to the locomotive's speed and its real-time braking capabilities at the locomotive's operating conditions (e.g., function of speed and total mass to be stopped), such that, upon detection of an unsafe condition, the locomotive operator can have sufficient time to stop locomotive 26 and avoid an accident. In some exemplary embodiment, rail vehicle 1 may be configured to communicate with locomotive 26 and directly actuate the emergency braking system of locomotive 26 upon detection of predetermined unsafety conditions.

One of the main functions of rail vehicle 1 is to verify safe rail track viability by informing rail operators of track conditions ahead of moving locomotive 26. Accordingly, rail vehicle 1 may be configured to transmit real-time data (e.g., video, audio and data in various formats) to a user-interface or monitoring console of locomotive 26 so that the locomotive operators can inspect the tracks in excess of a predetermined distance (e.g., 1 mile) ahead. Additional safety features of rail vehicle 1 as it travels ahead of the locomotive may include non-invasive and non-contact detection of rail defects. These safety features may enable rail vehicle 1 to eliminate or mitigate derailment events by timely inducing the actuation of emergency brakes when locomotive 26 is at a sufficient distance ahead of the detected track defects, obstruction, or anomaly.

Rail vehicle 1 is paired with one or more locomotives 26. For example, rail vehicle 1 may be magnetically and wirelessly coupled to locomotive 26. Based on a global positioning system (GPS) and pre-mapped rail-track networks, rail vehicle 1 may automatically disconnect from locomotive 26 and accelerate to travel at variable distances ahead of locomotive 26 to continuously scan for track anomalies, including track obstructions and track defects, as shown in, e.g., FIG. 2. The distance between rail vehicle 1 and locomotive 26 may be continuously adjusted depending on, for example, the real-time speed of locomotive 26 and SFB.

Rail vehicle 1 provides "eyes" to locomotive operators so that they can have information on track viability well ahead of locomotive 26. For example, as will be described in more detail with reference to FIGS. 12 and 13, at each rail crossing, rail vehicle 1 can slow down to verify correct functioning of rail signals and rail switch equipment at the rail crossing, stop in the middle of the rail crossing, and inform potential trespassers of approaching locomotive 26 with flashing lights and/or acoustic signals while physically impeding motorists from crossing the rail crossing. Rail vehicle 1 may also transmit images and/or video clips of the rail crossing in real time to the locomotive operators or rail operators to enable visual verification of the track's viability. If the locomotive operators or rail operators determine that the rail crossing is unsafe, they can activate the emergency brake system to stop locomotive 26 before reaching the rail crossing.

In some exemplary embodiments, rail vehicle 1 may be configured to determine an unsafe condition by itself. Accordingly, if rail vehicle 1 determines that the rail crossing is unsafe, it can transmit video and audio notification data to the locomotive operators to activate the emergency brake system and safe stopping prior to reaching the rail crossing. Alternatively, rail vehicle 1 may automatically activate the emergency brake system of locomotive 26 without relying on the action of the locomotive operators.

As locomotive 26 nears the rail crossing, rail vehicle 1 may accelerate to match the speed of locomotive 26 and physically couple thereto via a suitable magnetic coupling mechanism. Alternatively, rail vehicle 1 may continue to accelerate to reposition itself ahead of locomotive 26 according to the locomotive braking/stopping capabilities at the operating speed. Overall, off-normal or unsafe conditions in the track will be detected by rail vehicle 1 as it continues to move ahead of locomotive 26.

Rail vehicle 1 may be configured to scan its surroundings, gauge track conditions, and communicate with locomotive operators (or track operators) in real-time so as to timely activate emergency brakes when off-normal track conditions or other unsafe condition near rail vehicle 1 is detected. For example, rail vehicle 1 may utilize various types of sensors and imaging devices (e.g., LIDAR, RADAR, ultrasonic detector, and camera) to detect the off-normal track conditions or unsafe condition near rail vehicle 1.

For example, FIG. 3 schematically illustrates various features of rail vehicle 1, according to an exemplary embodiment of the present disclosure. Rail vehicle 1 may include a plurality of wheels 3 configured to engage rail track 4. Rail vehicle 1 may be configured to travel in both directions of rail track 4. Rail vehicle 1 may be substantially symmetrical with respect to its center, such that the front and the rear of rail vehicle 1 may be interchangeable.

Rail vehicle 1 may include a hood 2 substantially enclosing various internal components thereof. Hood 2 may include a plurality of vents for air intake and discharge to cool down heat generating equipment inside rail vehicle 1. Hood 2 may have an aerodynamic shape and configuration to reduce the drag and thereby increase fuel efficiency. Hood 2 may be painted with a light-reflective material to enhance visibility.

As mentioned above, rail vehicle 1 may include one or more warning devices 34, such as, for example, emergency lightings and/or speakers configured to visually and/or acoustically alert people (e.g., trespassers) nearby of an incoming locomotive 26. In some exemplary embodiments, as shown in FIG. 3, emergency warning devices 34 may be placed on hood 2. Warning device 34 may be sufficiently visible and/or acoustically loud so as to alert the nearby people, especially when rail vehicle 1 approaches a location with known safety issues (e.g., a rail-crossing).

Rail vehicle 1 may also include one or more video cameras 35 for scanning the visual field surrounding rail vehicle 1. In one exemplary embodiment, the video camera may be supported by an external structure of hood 2. The images and/or video data captured by rail vehicle 1 may be transmitted wirelessly and in real-time to the operator of the paired locomotive (or any other safety personnel on or off locomotive 26) via an antenna 15. The paid locomotive may include a suitable display device (e.g., dashboard console or operator user interface) to display the images and/or video data transmitted from rail vehicle 1.

Rail vehicle 1 may include a plurality of sensors 13, 14 connected to a controller and configured to survey the surroundings of rail vehicle 1 to, for example, detect any obstacles and verify the viability of rail track 4 ahead of locomotive 26. Sensors 13 and 14 may be configured to scan frontal, lateral, and/or rear sides of rail vehicle 1 via variable scanning ranges 8 covering a 360-degree field. Sensors 13 and 14 may extend from hood 2, and hood 2 may include a suitable mechanical coupling to support sensors 13 and 14.

In one exemplary embodiment, sensors 13 and 14 may comprise at least one of a light detection and ranging (LIDAR) to map the surroundings of rail vehicle 1 and an ultrasound and microwave RADAR to monitor the position of static or dynamic objects near rail vehicle 1. Rail vehicle 1 may also include a GPS, a gyroscope, and/or any other suitable sensors (e.g., speed detector) to provide an accurate positioning of rail vehicle 1.

As shown in FIG. 3, rail vehicle 1 may also include one or more proximity sensors 22b to control the paring between rail vehicle 1 and locomotive 26. For example, the coupling between rail vehicle 1 and locomotive 26 may be achieved by an electro-magnetic paring mechanism, and the proximity sensors 22b may be used to control the coupling. In one exemplary embodiment, rail vehicle 1 may include magnetic couplers 23 configured to couple with magnetic couplers 22 of locomotive 26.

Rail vehicle 1 may also include one or more non-contact sensors 16a to continuously scan rail track 4 to detect any flaw in rail track 4. Sensors 16a may be positioned under or on the sides of rail vehicle 1. Non-contact sensors 16a may be coupled to a flaw detection system 16, housed inside an enclosure 16c, where the enclosure 16c is equipped with active and passive vibration isolation elements 16b. Vibration isolation elements 16b can be formed by passive spring-damping shock absorbers. In another embodiment, vibration isolation elements 16b can be formed by active spring-damping shock absorbers. In another configuration, vibration isolation elements 16b can be formed of a combination of active and passive spring-damping shock absorbers. Vibration isolation elements 16b can be coupled to enclosure 16c to mechanically separate flaw detection system 16 and non-contact sensors 16a from a structure 21 of rail vehicle 1, and further attenuate or actively eliminate the shocks transmitted via the structure 21 of rail vehicle 1 to flaw detection system 16.

Rail vehicle 1 may be fully autonomous and equipped with features that enable its rapid positioning on, or removal from, rail tracks. Railroad networks are mapped in rail vehicle 1 computer interfaced with automotive sensing equipment (e.g., LIDAR, RADAR, ultrasonic and video cameras) to define its surroundings and verify rail track viability. In addition to equipment dedicated to execute autonomous and driverless operations, rail vehicle 1 can be equipped with non-disruptive non-contact sensors and analyzers dedicated to detect track flaws.

Rail vehicle 1 may be electrically powered by a rechargeable battery pack electrically coupled to an internal combustion (IC) engine. The IC engine provides propulsion and battery charging power (hybrid car configurations), with a fuel tank ensuring a minimum of 2,500 miles traveling distance. Rail vehicle 1 battery pack can also be recharged while paired with the locomotive and during braking operations. While paired, rail vehicle 1 can provide electric power back to the locomotive (e.g., providing an external electric power supply to the locomotive when the Automatic Start and Shutdown Equipment is activated as a result of prolonged idling conditions, often resulting in draining locomotive lead-acid batteries).

Rail vehicle 1 structure 2a, whose top portions are protected from the environment by coupling with hood 2, mechanically supports and comprises a first enclosure 9 housing an Internal Combustion (IC) engine 9a. The IC engine 9a can be configured to be fossil-fueled and fully operational with a fuel tank capacity assuring extended autonomous operations (e.g. in excess of 2,000 miles between refueling or recharging of battery pack 10a). Enclosure 9 can be configured to house the IC engine 9a and the IC engine auxiliary equipment 9b. The IC engine auxiliary equipment comprises, for example, an air-cooled IC engine coolant radiator, electrical fans, water and oil pumps and the fuel tank. In some configurations, the fuel tank and the IC engine cooling radiator can be located outside of enclosure 9 and into a dedicated enclosure.

In some configurations, the air intake, exhaust gases and cooling air discharges supporting the IC engine 9 operations can be represented by environmental air ports and vents distributed throughout the hood 2 surfaces and the bottom portions of rail vehicle 1. The IC engine 9a is further configured to supply electric and hydraulic power to hydraulic or electric traction motors equipping the tread-traction motor modules 5. The IC engine 9a and the battery pack 10a can be configured to supply propulsion power to electric traction motors 3, mechanically coupled to wheels 3. When rail vehicle 1 decelerates and brakes, electric energy produced by the electric traction motors 3 when configured as electro-magnetic brakes, can be utilized to recharge the battery pack 10a. The electric traction motors 3a are redundant to ensure rail vehicle 1 can maintain safe distance from the locomotive 26 even during rail vehicle 1 malfunctioning.

A second enclosure 10, comprising a battery pack 10a, battery pack power management and thermal control systems and an emergency battery pack 10b. The second enclosure can be configured to mechanically couple with rail vehicle 1 structure 2a, and comprises the equipment to support thermal management (heating or cooling) of the battery pack 10a and to disconnect from the battery pack 10a and independently connect to the emergency battery pack 10b in case of malfunctioning of battery pack 10a. The first and second enclosures can be electrically coupled and operated to support various power charging/discharging configurations as generally adopted by power management systems employed by automotive hybrid cars. The emergency battery pack 10b is part of a redundant power system to ensure rail vehicle 1 maintains its safety functions even when the main battery pack 10a is malfunctioning. In this case, rail vehicle 1 notifies the rail operators in locomotive 26 that rail vehicle 1 is experiencing malfunctions, but continues to support its safety functions for a time sufficiently long to dispatch rail vehicle 11 replacement without disrupting the travel schedule of locomotive 26.

A third enclosure 11, comprising electrical and electronic equipment to process and control data provided by the first, second and third sets of sensors, and to control and manage the equipment comprised in the first and second enclosures. The third enclosure houses dedicated and redundant computers and transmission equipment. The third enclosure is further equipped with data ports to update, upload, and download data and software from/to rail vehicle 1. Data transfer and software updates can also be executed wirelessly, through redundant antennas 15, designed to wirelessly transmit/receive processed and command data 15a to and from the locomotive 26, generally traveling at distances greater than one mile behind rail vehicle 1.

On the proximal and distal sides of rail vehicle 1 in the direction parallel to rail tracks 4, a shock absorbing and magnetic pairing system 7 is configured to attenuate shocks while magnetically pairing rail vehicle 1 to locomotive 26.

Figure 4:
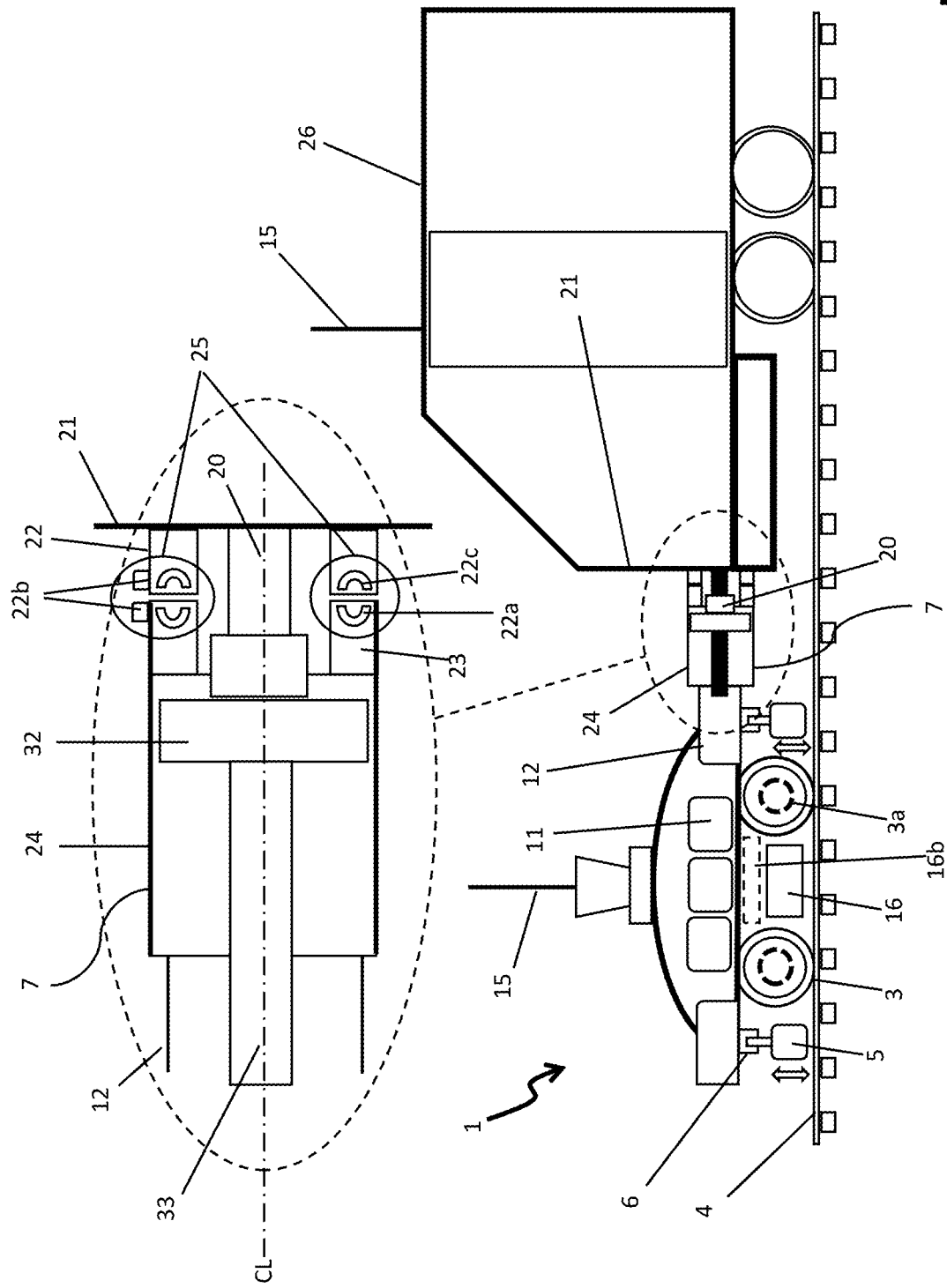
FIG. 4 is a functional schematic and cross-sectional view of the rail vehicle of FIG. 3, illustrating electro-magnetic coupling between the rail vehicle and the locomotive, according to an exemplary embodiment consistent with the present disclosure.

With reference to FIG. 4, the shock absorbing system attenuates shocks substantially in the direction parallel to the rail tracks 4 and comprise a coupler stopper 32 to tangentially mate without locking to the railcar coupler 20 mechanically coupled to locomotive 26. The shock absorbing system and magnetic pairing system 7 is formed by the coupler housing 12, is structurally coupled on one side to structure 2a of rail vehicle 1, and to the retrofitted magnetic coupling and pairing system forming the railcar electromagnetic couplers 22 mechanically coupled to locomotive 26.

As rail vehicle 1 is substantially symmetrical and can move in both directions 18 (FIG. 3), parallel to the rail track 4, the shock absorbing system and magnetic pairing system 7 equips both axial ends of rail vehicle 1.

The shock absorbing system and magnetic pairing system 7 further comprising a hydraulic piston 33, mechanically coupled to the coupler stopper 32, and configured to slide linearly and bi-directionally while moving within the coupler housing 12. As the hydraulic piston 33 is compressed, for example, by mechanical tangential mating of rail coupler 20 of locomotive 26 (e.g. when locomotive 26 is proceeding at a higher velocity than that of rail vehicle 1 at the time of coupling and pairing), a hydraulic fluid, flowing within fluid restrictions between the hydraulic piston 33 and the coupler housing 12, is configured to dampen and attenuate mechanical shocks caused by the mechanical pairing of rail vehicle 1 with the locomotive 26, via railcar coupling 20. When rail vehicle 1 is decoupled from the locomotive, the hydraulic fluid is configured to reset the position of hydraulic piston 33 to present the maximum stroke (maximum distance traveled by the hydraulic piston within housing 12) so as to enable a smoother and safer coupling.

The magnetic coupler and pairing system 7 further comprises a set of electro-magnets 22a to magnetically pair rail vehicle 1 to locomotive 26. Two sets of electro-magnets enable magnetic-mechanical coupling of rail vehicle 1 with locomotive 26: The first set of electro magnets 22a is housed and mechanically coupled to rail vehicle 1 magnetic couplers 23 (part of housing 12 of rail vehicle 1). The second set of electro-magnets 22c are mechanically coupled to the railcar electromagnet housing 22. The first and second set of electromagnetic couplers 22a and 22c can be configured annularly around the axial centerline of rail coupler 20. The second set of electromagnets can be retrofitted with locomotive 26 by coupling the railcar electromagnet housing 22 to the railcar frontal plate or structure 21, in a position substantially centering the rail coupling 20.

The rail vehicle 1 external coupler housing comprises, the magnetic coupler and pairing system 7, the shock absorbing housing 12, and the magnetic coupler 23.

The first and second set of electro-magnets 22a and 22c can further be configured to transfer electric energy and data (power and data pairing) to and from rail vehicle 1 and the paired railcar or locomotive 26.

With reference to FIGS. 1, 2, and 4, and to summarize the mechanically coupling and magnetic pairing functions of rail vehicle 1 external coupler 24 and those of the railcar electromagnet housing 22, rail vehicle 1 is assumed to approach locomotive 26. As rail vehicle 1 nears the rail coupler 20, rail vehicle 1 external housing coupler 24 surrounds the rail coupler 20 as a sleeve without contacting it. As rail vehicle 1 continues the approach, the distance between the coupling stopper 32 and the frontal portions of the rail coupler 20 decreases, while being monitored through the redundant proximity sensors 22b. Rail vehicle 1 control system, comprised by the third enclosure 11, initially sets the electromagnets 22a to generate a magnetic field to repel the magnetic field generated by electromagnets 22c (to attenuate the approach). While executing these operations rail vehicle 1, wirelessly transmits pairing and coupling information and commands via antennae 15 to locomotive 26. If the approaching speed is too high, the hydraulic piston slides toward rail vehicle 1 to further attenuate the coupling. As the proximity sensors 22b verify pre-programmed adequate distance between rail vehicle 1 and locomotive 26, rail vehicle 1 control system repolarizes the electromagnets 22a to maintain magnetic coupling between rail vehicle 1 and locomotive 26.

When rail vehicle 1 is dispatched to execute rail track scouting safety functions and disengages from locomotive 26, rail vehicle 1 control system repolarizes the electromagnets 22a to repel the pairing electromagnets 22c, while rail vehicle 1 traction motors 3a accelerate rail vehicle 1 as it disconnects from locomotive 26 and increase the distance between rail vehicle 1 and locomotive 26. As rail vehicle 1 accelerates or decelerates to maintain a variable distance—proportional to the speed and emergency braking distance of the locomotive 26, it continuously scans its surroundings and the rail tracks to detect challenges to tracks viability. While traveling at a distance enabling safe stop of the locomotive 26, rail vehicle 1 may detect rail tracks flaws 27 or obstacles 28 which can jeopardize safety. As a result, a first emergency notification is wirelessly transmitted from rail vehicle 1 to the rail operators in charge of the paired locomotive 26. In this first notification rail vehicle 1 communicates the location of potential safety breach ahead of the locomotive 26 supported by video data, when applicable, or other coded information indicating the type of rail track flaws identified. Should rail operators fail to timely intervene with rail vehicle 1 reaching and confirming the potential safety breach, rail vehicle 1 issue a second notification with automatic activation of the locomotive emergency brakes to ensure locomotive 26 stops with sufficient safety margin prior to reaching rail vehicle 1 or the location where rail tracks viability was detected as off-normal.

With reference to FIGS. 3, 5, and 6, a positioning system 6 comprises a plurality of extendable treaded and motorized traction modules 5 to actuate positioning, alignment and coupling of rail vehicle 1 wheels 3 to rail tracks 4. The extendable treaded and motorized traction modules 5 further comprise a set of traction treads 5a to propel and steer rail vehicle 1 when off-railing, on rugged terrain. The motorized traction modules 5 can be manually or remotely controlled to "drive" rail vehicle 1 around and above the rail tracks 4. The traction treads 5a are configured to climb the rail tracks 4, and to actuate lifting or lowering of rail vehicle 1 by actuators 6a. Actuators 6a are actuated to de-rail/disengage or rail/engage rail vehicle 1 wheels 3 with the rail tracks 4. For example, FIG. 5 shows rail vehicle 1 stripped of the hood 2, in a configuration wherein the wheel 3 are a Distance "D≠0" with respect to the rail tracks 4. In this configuration, rail vehicle 1 is "derailed" as its structural frame 2a is lifted by Actuators 6a. In this configuration, rail vehicle 1 can be moved away from the rail tracks. In FIG. 5, rail vehicle 1 is shown aligned and coupled to the rail tracks 4 with the distance between the wheels 3 and rail tracks 4 zeroes (e.g. D=0). In this configuration, rail vehicle 1 is ready to execute rail-tracks scouting operations.

Actuators 6a further comprise hydraulic pistons 6b to mechanically actuate the lifting or lowering of rail vehicle 1. Actuators 6a can be coupled to rail vehicle 1 structure 2a on one end, and to the tread-motor traction module 5 on the other.

A second set of active and passive vibration isolation elements 29 attenuates vibrations caused by the mechanical couplings of wheels 3 with the rail track 4 and rail vehicle 1 structural frame 2a. The second set of vibration isolation elements 29 can be formed by passive spring-damping shock absorbers. In another configuration, the vibration isolation elements 29 can be formed by active spring-damping shock absorbers. In another configuration, the vibration isolation elements 29 can be formed by a combination of active and passive spring-damping shock absorbers.

FIGS. 7A-7E illustrate an example of rail vehicle 1 when maneuvering off-rails and executing rail tracks climbing to couple with rail tracks 4 or derailing from rail tracks 4. FIG. 7A provides a perspective view of rail vehicle 11 without hood, 2 while approaching rail tracks 4 perpendicularly (or at any other angle) so as to position and align itself onto the rail tracks 4 or to disengage from rail tracks 4.

FIG. 8 is a perspective view of a preferential configuration of rail vehicle 11 shown in the previous figures, with rail vehicle 1 shown without hood 2, and paired to locomotive 26, according to an exemplary embodiment of the invention. This configuration shows rail vehicle 1 mechanically coupled and magnetically paired to locomotive 26, with the tread-motor traction modules lifted and positioned into "rail operation". Rail vehicle 1 can be paired to locomotive 26 to support different functions including: Pairing rail vehicle 1 computers with locomotive 26 dashboard console or user interface; To synchronize wireless communications; To transfer electric energy from rail vehicle 1 to locomotive 26 or vice versa. To "push" rail vehicle 1 as locomotive 26 is in motion and recharge rail vehicle 1 battery pack 10a via traction motor-generators 3a.

FIG. 9 is a perspective view of the hooded rail vehicle 11 illustrating a preferential configuration of the various sensing features and the substantially symmetrical rail vehicle 1 external coupler housing 24 and shock absorbing housing 12, described in FIGS. 1-8, according to one exemplary embodiment of the invention.

FIG. 10 is a perspective view of the shown in FIG. 9 without the hood and illustrating in more detail the key components equipping rail vehicle 1, according to one exemplary embodiment of the invention. In this Figure, the IC engine enclosure 9 is integral with cooling fans 9c to support the IC engine 9 and battery pack 10a thermal management systems.

Figure 11:
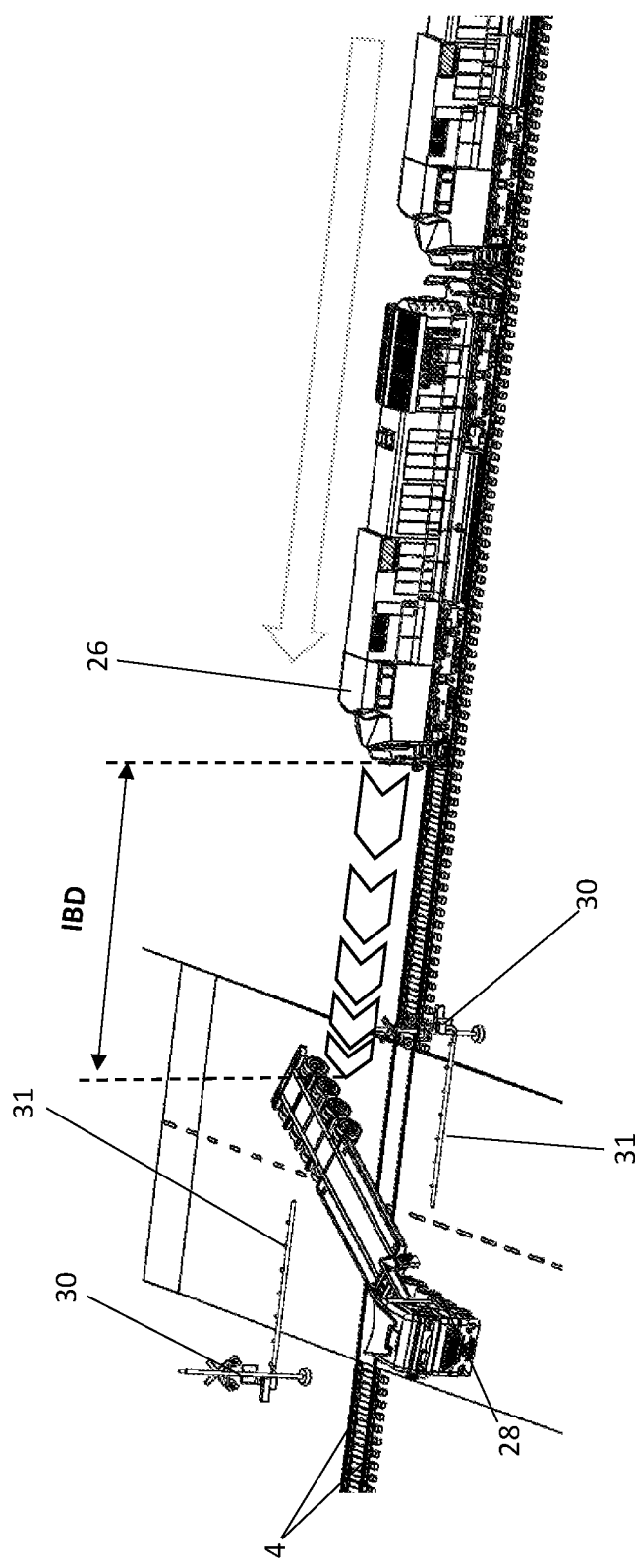
FIG. 11 is a perspective view of a locomotive approaching a rail crossing with a rail obstruction, where the distance required for the locomotive to stop is too large to avoid collision.

FIG. 11 is a perspective view of a locomotive 26 headed by locomotive 26 approaching a rail crossing obstructed by a disabled or intentionally trespassing vehicle. In this representation rail tracks viability is off-normal due to intentional or unintentional trespassing. Generally, identification of rail tracks obstructions by rail operators operating the locomotives occurs when the stopping distance required for locomotive 26 to stop is too large to avoid collision. In other words, rail tracks obstruction is generally detected when there is Insufficient Braking Distance (IBD), unavoidably leading to collision with potential loss of lives and property damage.

FIG. 12 is a top view of rail vehicle 1 in operation. Accordingly, rail vehicle 1 travels at a Safety Breaking Distance (SBD) ahead of the locomotive 26, and continuously scans three-dimensionally for rail tracks flaws and obstructions to verify safe rail tracks viability.

In FIG. 13, as rail vehicle 1 approaches a rail crossing 30a, whose location is pre-programmed in rail vehicle 1 computers, it checks and validates correct functioning of rail crossing equipment (e.g. signals, switches, automatic gate barriers when applicable), and slows down to come to a stop in a central area of the rail crossing. At this location, rail vehicle 1 visually and acoustically warn potential trespassers of the upcoming locomotive 26 via emergency light and acoustic warning system 34, while physically obstructing potential motorists from dribbling the rail crossing gate barriers and trespass the rail crossing 30a, as shown in FIG. 9. As the locomotive 26 nears the rail crossing, rail vehicle 1 starts to accelerate and match the locomotive velocity to pair with locomotive 26, or it continues to accelerate to reposition itself to a Safety Breaking Distance while continuing its rail scouting functions.

Figure 14:
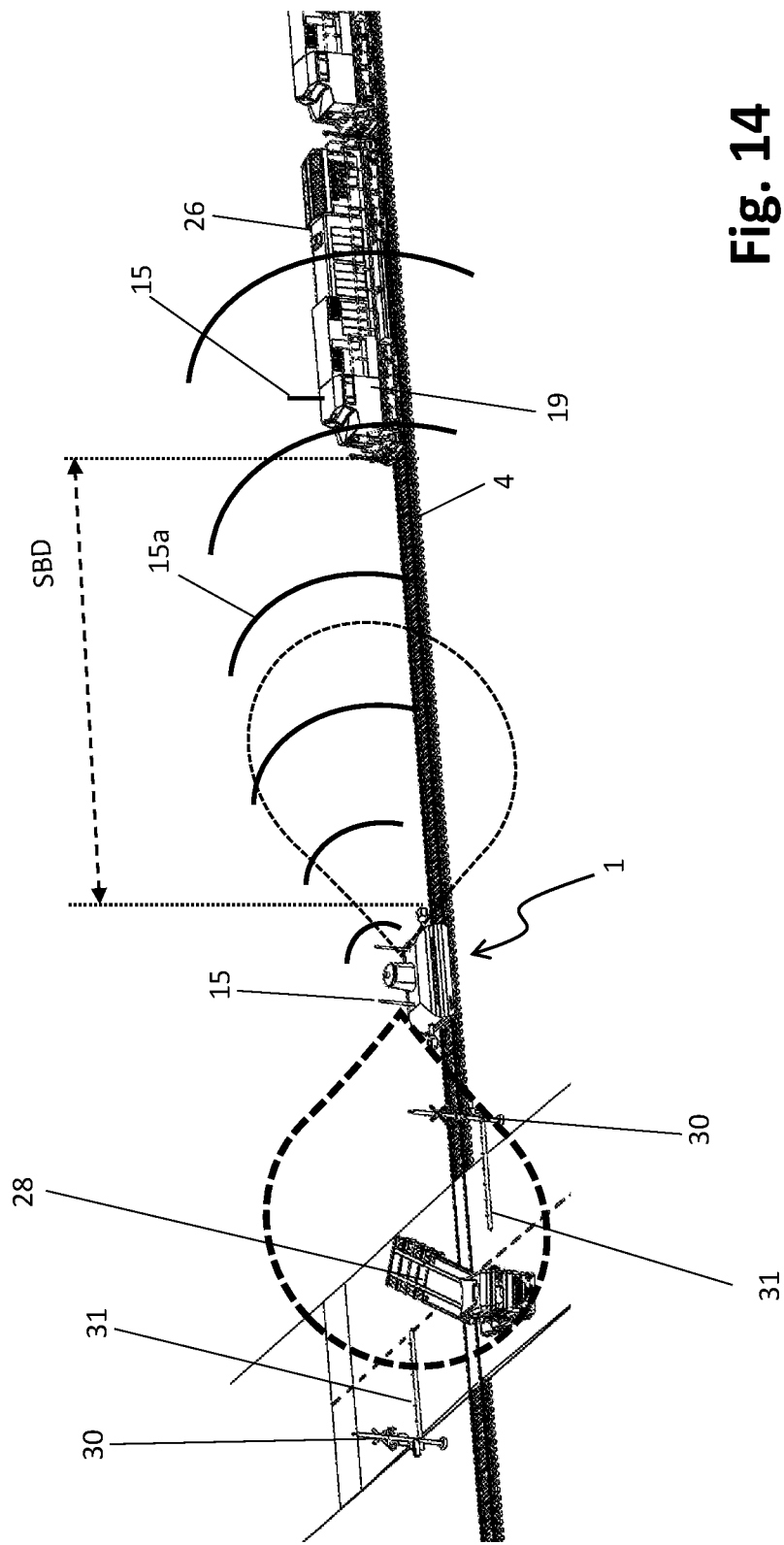
FIG. 14 is a perspective view of the rail vehicle, illustrating detection of off-normal rail track viability and activation of the locomotive emergency brake system at an SFB from the location of the detected anomaly.

FIG. 14 is a perspective view of rail vehicle 1 illustrating detection of off-normal rail track viability and subsequent activation of the emergency brake system via wireless transmission to rail operators operating the locomotive 26. The Safe Braking Distance (SFB) factors sufficient time for the first and second warning notification as a function of the locomotive's speed and stop braking distance at the given speed. Should the locomotive operators fail to activate the emergency brake system and the obstruction 28, triggering the first notification, persist at the rail crossing location, rail vehicle 1 wirelessly activates the locomotive's emergency braking system to ensure the locomotives 26 comes to a stop prior to reaching the location wherein the rail tracks anomaly was detected.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. An autonomous real-time rail track scouting vehicle, hereafter referred to as autonomous rail vehicle, comprising:
    a positioning system, coupled to a plurality of extendable treaded and motorized traction modules to actuate alignment and coupling of wheels of the autonomous rail vehicle to rail tracks, the extendable treaded and motorized traction modules further comprising;
    a set of traction treads to move and steer the autonomous rail vehicle on rugged terrain and drive it around and above the rail tracks, wherein the traction treads are configured to climb the rail tracks, and actuate lifting or lowering of the autonomous rail vehicle by actuators, to de-rail/disengage or rail/engage wheels with the rail tracks, the actuators further comprising hydraulic pistons to mechanically actuate the lifting or lowering of the autonomous rail vehicle, the autonomous rail vehicle further comprising:
    a first set of a plurality of sensors to scan the autonomous rail vehicle surroundings, wherein the first set of sensors is configured all together with software and control systems to map the autonomous rail vehicle surroundings, to detect obstacles and verify rail track viability ahead of a locomotive,
    a second set of sensors dedicated to close proximity sensing and control of electro-magnetic pairing and mechanical coupling of the autonomous rail vehicle with rail carriages or locomotives forming locomotive, and to magnetically couple the autonomous rail vehicle to the locomotive, and
    a third set of non-contact sensors to continuously scan rail tracks to detect tracks' flaws, wherein the third set of sensors is coupled to a tracks' flaw detection system housed within an enclosure equipped with active and passive vibration isolation elements, configured to mechanically separate the tracks' flaw detection system and third set of non-contact sensors from the autonomous rail vehicle structures and further attenuate shocks transmitted via the autonomous rail vehicle to the tracks' flaw detection system, the autonomous rail vehicle comprising:

a housing coupled to the autonomous rail vehicle, wherein the autonomous rail vehicle structure mechanically supports and further comprises: a first enclosure further comprising an internal combustion engine, a second enclosure further comprising a battery pack and battery pack power management system, and a third enclosure further comprising electrical and electronic equipment to process and control data provided by the first, second and third sets of sensors, and to control and manage the equipment comprised in the first, second and third enclosures, wherein the housing structurally supports the first set of sensors and redundant antennas to wireless transmit and receive processed and command data to and from the locomotive, wherein the internal combustion engine housed by the first enclosure is configured to supply electric power to the battery pack and to traction motors-generator and braking system, the autonomous rail vehicle further comprising:

a shock absorbing system coupled to a magnetic pairing system to mechanically couple the autonomous rail vehicle to a railcar or locomotive coupling, the shock absorbing system comprising:

a coupler stopper to mate without locking to the railcar coupler, a coupler housing, structurally coupled on one side to the autonomous rail vehicle and to the magnetic pairing system on an opposite side, the coupler housing equipping at least one axial end of the autonomous rail vehicle and the coupler housing further comprising:

a hydraulic piston, coupled to the coupler stopper, linearly and bi-directionally moving within the coupler housing, and a hydraulic fluid flowing within fluid restrictions between the hydraulic piston and the coupler housing, to attenuate mechanical shocks caused by the mechanical pairing of the autonomous rail vehicle with the locomotive via railcar coupling, wherein the magnetic pairing system further comprises: a set of electro-magnetic couplers to magnetically pair the autonomous rail vehicle to the locomotive via railcar electro-magnetic couplers, and to transfer electric energy to and from a paired locomotive to or from the autonomous rail vehicle, wherein the autonomous rail vehicle further comprises:

a set of emergency lights and fixtures housing said lights and speakers, to visually and acoustically inform potential trespasser of the approaching locomotive, a set of video cameras transmitting 360 degrees video imaging to the locomotive's operators.

2. A method of operating the autonomous rail track scouting vehicle of claim 1, ahead of a locomotive traveling at a safe breaking distance from its paired locomotive to verify whether rail tracks are viable, and to remotely initiate procedures to activate the locomotive emergency brakes should the autonomous rail vehicle detect off-normal rail tracks viability, wherein the activation of the locomotive's emergency brake system comprises:

a first notification, wirelessly transmitted to the locomotive's operators, informing that the rail vehicle rail tracks flaws or off-normal tracks viability detection systems, detected unsafe viability condition, shortly followed by a second notification, wirelessly transmitted, informing the locomotive's operators that the emergency brake system are being actuated to ensure the locomotive stops before reaching the tracks location where off-normal tracks viability or tracks flaws where identified.

* * * * *